US011068317B2

(12) United States Patent
Matsuura et al.

(10) Patent No.: US 11,068,317 B2
(45) Date of Patent: Jul. 20, 2021

(54) INFORMATION PROCESSING SYSTEM AND RESOURCE ALLOCATION METHOD

(71) Applicant: Hitachi, Ltd., Tokyo (JP)

(72) Inventors: Yoshiki Matsuura, Tokyo (JP); Izumi Mizutani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 97 days.

(21) Appl. No.: 16/493,319

(22) PCT Filed: Jun. 15, 2018

(86) PCT No.: PCT/JP2018/022941
§ 371 (c)(1),
(2) Date: Sep. 12, 2019

(87) PCT Pub. No.: WO2018/235739
PCT Pub. Date: Dec. 27, 2018

(65) Prior Publication Data
US 2020/0034209 A1 Jan. 30, 2020

(30) Foreign Application Priority Data

Jun. 22, 2017 (JP) .............................. JP2017-122235

(51) Int. Cl.
*G06F 9/50* (2006.01)
*G06F 9/48* (2006.01)

(52) U.S. Cl.
CPC .............. *G06F 9/5083* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4887; G06F 9/50;
(Continued)

(56) References Cited

U.S. PATENT DOCUMENTS 9,112,750 B2   8/2015  Ishikawa
10,871,988 B1* 12/2020 Gao ........................ G06F 9/445
(Continued)

FOREIGN PATENT DOCUMENTS

| JP | 2009-524135 A | 7/2007 |
| JP | 2007-272297 A | 10/2007 |
| WO | 2012/164689 A1 | 12/2012 |

OTHER PUBLICATIONS

International Search Report of PCT/JP2018/022941 dated Aug. 14, 2018.

*Primary Examiner* — Charles M Swift
(74) *Attorney, Agent, or Firm* — Mattingly & Malur, PC

(57) ABSTRACT

Provided is an information processing system that is capable of quickly starting an application program even in a case where a computer resource pool is depleted, and of completing without reducing the quality of service even in the case of an application that is ended in a short amount of time. A management server manages computer resources and a usage state of the computer resource, and in a case where no computer resources is available, and an expected execution time of the application is less than or equal to a reference value, at the time of receiving a degree of parallel and the expected execution time of the application from a user, selects computer resource executing an application having a relatively small degree of deviation from an initial expected execution time, even in a case where a plurality of applications are temporarily simultaneously executed, and arranges and executes the application.

9 Claims, 9 Drawing Sheets

(52) U.S. Cl.
CPC .......... *G06F 9/4843* (2013.01); *G06F 9/4881* (2013.01); *G06F 9/4887* (2013.01); *G06F 9/50* (2013.01); *G06F 9/5005* (2013.01); *G06F 9/5027* (2013.01); *G06F 9/5061* (2013.01); *G06F 9/5077* (2013.01)

(58) Field of Classification Search
CPC .... G06F 9/5005; G06F 9/5027; G06F 9/5061; G06F 9/5077; G06F 9/5083
See application file for complete search history.

(56) References Cited

U.S. PATENT DOCUMENTS

| | | | |
|---|---|---|---|
| 2007/0174458 A1 | 7/2007 | Boyce, Jr. et al. | |
| 2014/0201753 A1* | 7/2014 | He ...................... | G06F 9/4881 718/104 |
| 2015/0178419 A1* | 6/2015 | Li ........................ | G06F 9/5066 703/2 |
| 2016/0098292 A1* | 4/2016 | Boutin .................. | G06F 9/505 718/104 |
| 2017/0357530 A1* | 12/2017 | Shih ...................... | G06F 9/4887 |
| 2018/0039520 A1* | 2/2018 | Lu ........................ | G06F 9/5027 |
| 2018/0181390 A1* | 6/2018 | Lepcha ................ | G06F 9/5066 |
| 2018/0246765 A1* | 8/2018 | Chen .................... | G06F 9/4881 |

\* cited by examiner

FIG. 3

| NODE NAME | IP ADDRESS | CPU Core | Pool FLAG | CLUSTER NAME | DEGREE OF PARALLELISM | APPLICATION NAME | |
|---|---|---|---|---|---|---|---|
| Node1 | 192.168.1.101 | 2 | true | User1-AppA-1 | 1 | AppA | 310-1 |
| | | | | User2-AppA-1 | 1 | AppA | 310-2 |
| Node2 | 192.168.1.102 | 2 | true | User3-AppA-1 | 1 | AppA | 310-3 |
| | | | | User4-AppA-1 | 1 | AppA | 310-4 |
| Node3 | 192.168.1.103 | 2 | true | User5-AppB-1 | 2 | AppB | 310-5 |
| Node4 | 192.168.1.104 | 2 | true | User5-AppB-1 | 2 | AppB | |
| | | | | User8-AppA-1 | 1 | AppA | 310-7 |
| Node5 | 192.168.1.105 | 2 | true | User6-AppB-1 | 2 | AppB | 310-6 |
| Node6 | 192.168.1.106 | 2 | true | User6-AppB-1 | 2 | AppB | |
| Node7 | 192.168.1.107 | 2 | true | User6-AppB-1 | 2 | AppB | |
| Node8 | 192.168.1.108 | 2 | true | User6-AppB-1 | 2 | AppB | |
| Node9 | 192.168.3.1 | 1 | false | User7-AppB-1 | 1 | AppB | 310-8 |

| CLUSTER NAME | DEGREE OF PARALLELISM | COEXIST-ENCE NUMBER | Pool USAGE NUMBER | LEVEL OF VARIATION IN EXECUTION TIME | REMAINING TIME | FIRST SCHEDULED END TIME | COEXIST-ENCE TIME | |
|---|---|---|---|---|---|---|---|---|
| User1-AppA-1 | 1 | 0 | 1 | 0 | 1m 30s | 2017/3/6 11:21:00 | | 410-1 |
| User2-AppA-1 | 1 | 0 | 1 | 0 | 2m 00s | 2017/3/6 11:22:15 | | 410-2 |
| User3-AppA-1 | 1 | 0 | 1 | 0 | 1m 00s | 2017/3/6 11:22:00 | | 410-3 |
| User4-AppA-1 | 1 | 0 | 1 | 0 | 15s | 2017/3/6 11:20:45 | | 410-4 |
| User5-AppB-1 | 4 | 1 | 4 | 2 | 48h 45m 00s | 2017/3/7 15:21:00 | 25m 15s | 410-5 |
| User6-AppB-1 | 8 | 0 | 8 | 1 | 6h 30m 00s | 2017/3/6 17:55:00 | | 410-6 |
| User7-AppB-1 | 1 | 0 | 0 | 0 | 30h 15m 00s | 2017/3/7 16:35:00 | | 410-7 |
| User8-AppA-1 | 1 | 1 | 1 | 0 | 5m 30s | 2017/3/6 11:25:30 | 1m15s | 410-8 |

Columns: 401, 402, 403, 404, 405, 406, 407, 408

400

INFORMATION PROCESSING SYSTEM AND RESOURCE ALLOCATION METHOD

TECHNICAL FIELD

The present invention relates to a resource allocation method and an information processing system thereof.

BACKGROUND ART

Recently, it has been possible to quickly launch an execution environment of various application programs (hereinafter, referred to as an application), in accordance with the development of a virtualization technology referred to as a container. Accordingly, a cloud service provider ensures a resource pool common to applications for the execution environment of various applications that are provided on a cloud without ensuring each dedicated resource, and only deploys the container corresponding to the application in the resource pool for each application execution request of a user, and thus, is capable of constructing the execution environment of the application, and is capable of reducing a resource amount to be ensured as the resource pool.

However, in a case where the resource amount of the resource pool is excessively reduced, there is a possibility that the resource is depleted in a case where the application execution requests of a plurality of users overlap each other in untimely moment. In a case where the resource is depleted, a standby time for waiting for an available resource or acquiring a new resource from the cloud occurs, and thus, responsiveness is degraded. In particular, in a case where the application execution request of the user is originally a request that is ended in a short amount of time, a ratio of the standby time to the request relatively extremely increases, and thus, the quality of service with respect to the user who waits for a high-speed response is greatly reduced.

As the background art of such a field, in Patent Document 1, a modeling method of assuming a free pool size of a resource that is necessary for serving a service obligation is disclosed.

CITATION LIST

Patent Document

Patent Document 1: JP 2009-524135 W

SUMMARY OF THE INVENTION

Problems to be Solved by the Invention

In the modeling method described in Patent Document 1, a resource usage rate of a customer is modeled as a beta distribution (paragraph [0009]), and the free pool size that is necessary for attaining a usage rate target by using beta distribution simulation is predicted (paragraph [0015]). Accordingly, a timing at which the resource pool seems to be depleted is predicted, and thus, it is possible to increase the resource.

However, the modeling method described in Patent Document is effective in a case where a resource usage amount is gradually changed, but is not capable of responding to the application execution requests from the plurality of users that occur suddenly. In a case where such an unexpected application execution request is the request that is ended in a short amount of time, a reduction in the quality of service is not solved.

Therefore, an object of the present invention is to provide an information processing system that is capable of quickly starting an application program even in a case where a computer resource pool is depleted, and of completing processing without reducing the quality of service even in the case of an application that is ended in a short amount of time.

Solutions to Problems

In a preferred example of an information processing system of the present invention, an information processing system, including: a management server; and a plurality of processing servers, the information processing system providing execution of an application program through a network in accordance with a request from a user, is configured such that each of the processing servers includes one or more processors for executing the application program, the management server manages computer resources that are capable of being executed as each of the processing servers, a usage state of the computer resource, and a cluster usage situation or request information from the user, and information relevant to an execution time of the application program, for each cluster executing one application program, and in a case where no computer resources managed by the management server is available, and an expected execution time of the application program that is a target of an execution request is less than or equal to a reference time value, at the time of receiving a degree of parallel and the expected execution time of the execution from the user, along with an execution request of the application program, a cluster generation unit of the management server selects a computer resource executing an application program having a relatively small degree of deviation from an initial expected execution time from the computer resources in use that are managed by the management server, even in a case where a plurality of application programs are temporarily simultaneously executed, and arranges and executes the application program that is the target of the execution request with respect to the selected computer resource.

In addition, as another feature of the present invention, in the information processing system, even in a case where the plurality of application programs are temporarily simultaneously executed, the cluster generation unit of the management server preferentially selects a computer resource belonging to a cluster in which a remaining time is long, a coexistence number is small, a coexistence time is short, and a Pool usage number is large, at the time of selecting the computer resource executing the application program having a relatively small degree of deviation from the initial expected execution time.

In addition, as still another feature of the present invention, in the information processing system, even in a case where the plurality of application programs are temporarily simultaneously executed, the cluster generation unit of the management server preferentially selects a computer resource belonging to a cluster in which priority is set by multiplying small and large values of each information item of the remaining time, the coexistence number, the coexistence time, and the Pool usage number, by a weight coefficient, at the time of selecting the computer resource executing the application program having a relatively small degree of deviation from the initial expected execution time.

In addition, in a preferred example of a resource allocation method of the present invention, an information processing system, including: a management server; and a plurality of processing servers, the information processing system providing execution of an application program through a network in accordance with a request from a user, is configured such that each of the processing servers includes one or more processors for executing the application program, the management server manages computer resources that are capable of being executed as each of the processing servers, a usage state of the computer resource, and a cluster usage situation or request information from the user, and information relevant to an execution time of the application program, for each cluster executing one application program, and in a case where no computer resources managed by the management server is available, and an expected execution time of the application program that is a target of an execution request is less than or equal to a reference value, at the time of receiving a degree of parallel and the expected execution time of the execution from the user, along with an execution request of the application program, the management server selects a computer resource executing an application program having a relatively small degree of deviation from an initial expected execution time from the computer resources in use that are managed by the management server, even in a case where a plurality of application programs are temporarily simultaneously executed, and arranges and executes the application program that is the target of the execution request with respect to the selected computer resource.

Effects of the Invention

According to the present invention, even in a case where a resource pool is depleted, it is possible to quickly start an application program, and even in the case of an application that is ended in a short amount of time, it is possible to complete processing without reducing the quality of service.

BRIEF DESCRIPTION OF THE DRAWINGS

FIG. 3 is a diagram illustrating an example of a data table that is managed by a resource allocation information storage unit.
FIG. 4 is a diagram illustrating an example of a data table that is managed by an application progress information storage unit.

MODE FOR CARRYING OUT THE INVENTION

Figure 1:
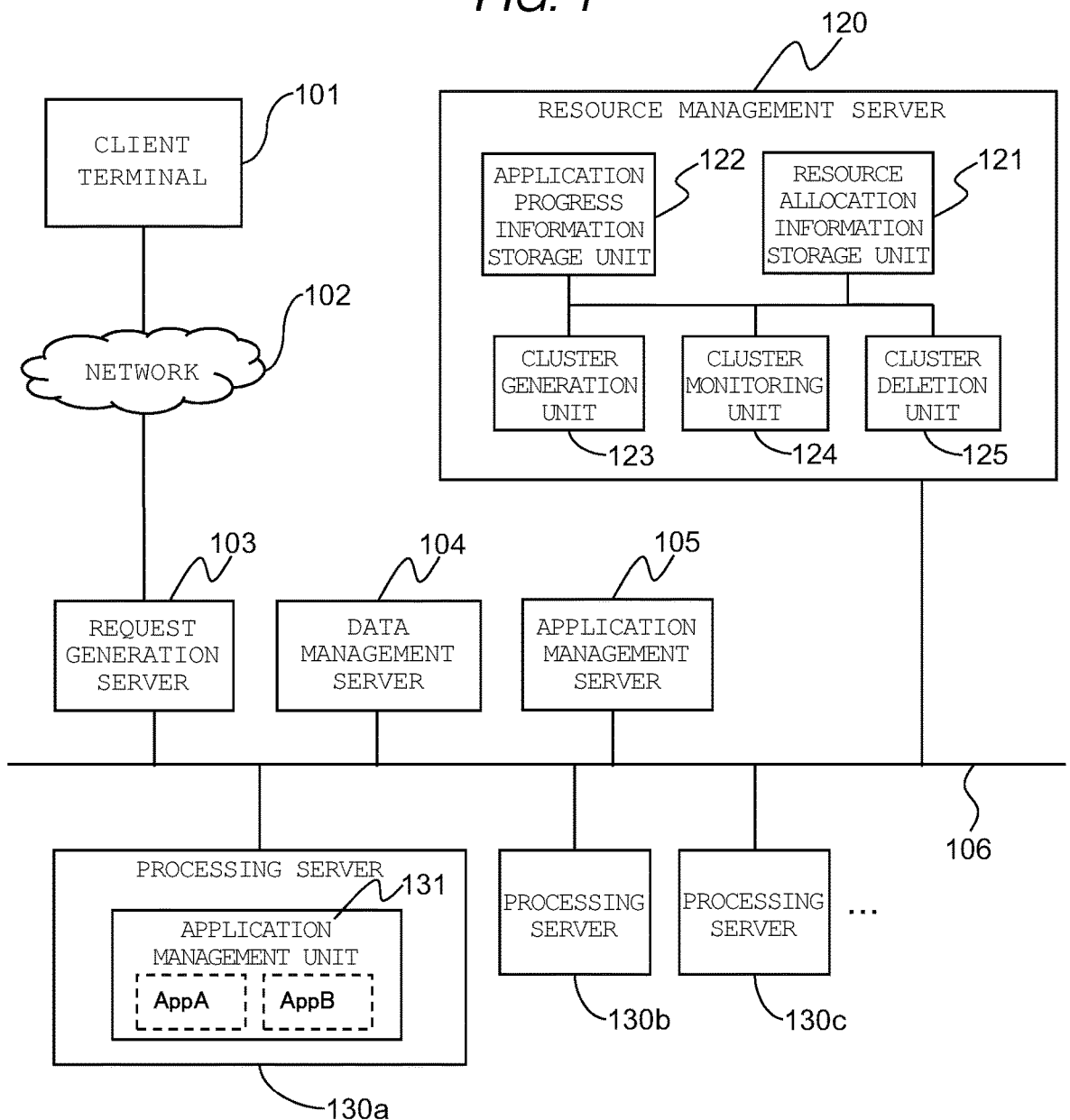
FIG. 1 is a diagram illustrating an example of an overall configuration of an information processing system.

Hereinafter, embodiments in an example will be described with reference to the drawings. Furthermore, in the drawings used in the following examples, portions to which the same reference numerals are applied indicate the same constituent, and the structure and the operation thereof are the same.

Example 1

FIG. 1 is an example of an overall configuration of an information processing system according to Example 1. The information system according to Example 1 includes a client terminal 101, a request generation server 103 that is connected to the client terminal 101 through a network 102, and a data management server 104, an application management server 105, a resource management server 120, and a plurality of processing servers 130 that are connected to the request generation server 103 through a network 106. In FIG. 1, the client terminal 101 and the other servers (the request generation server 103, the data management server 104, the application management server 105, the resource management server 120, and the processing server 130) are connected to different networks (102 and 106), and the information processing system may be configured such that the client terminal 101 and the other servers are connected to the same network.

The client terminal 101 is a terminal that is used by an application user, and is used for the application user to prepares input data to be processed by an application program (hereinafter, simply referred to as an "application"), and to transmit a processing request of the application to the request generation server 103, along with the input data. The client terminal 101, for example, is a personal computer or a server in a company or factory, or of a general individual, and a plurality of client terminals exist. Alternatively, the client terminal 101 may be a communication device having a communication function, such as a smart phone or a tablet terminal.

The network 102 is a wireless network or wired network that is provided by a communication carrier or the like. The network 102 may include a network possessed by an individual company or the like as a part of the network 102, or may be a network allowing a plurality of types of protocols to pass.

The request generation server 103 is a server that executes processing of receiving the processing request such as an application execution request from the client terminal 101, of performing the processing request with respect to the data management server 104, the application management server 105, the resource management server 120, and the processing server 130, on the basis of the received processing request, and of returning the processing result to the client terminal 101.

The data management server 104 is a server that stores data that is a processing target at the time of executing the application that receives the processing request (the input data), and is a shared file server in a case where the input data is a file, is a structure database server in a case where the input data is stored as a record, and is a server that stores data of a non-structure database or the like, such as key value storage, in a case where the input data is stored in the format of json or the like.

The application management server 105 is a server that manages the information of the application that is executed by the processing server 130, and calculates an estimation value of an execution processing time of the application by setting the input data or a computer resource.

An estimation method of the execution processing time of the application is a method in which a data amount, a parameter, and the like to be processed by the application are calculated, and each calculation logic is prepared in advance for each application at the time of being designed, or is statistically calculated from the history of the execution processing time of the application in the past.

The resource management server 120 is a server that manages a usage state of each of the processing servers 130, and dynamically performs the generation, the monitoring, or the deletion of a cluster, and includes a resource allocation information storage unit 121, an application progress information storage unit 122, a cluster generation unit 123, a cluster monitoring unit 124, and a cluster deletion unit 125. In this example, an assembly of the computer resources to be used when one application is executed (or an assembly of the processing servers 130 including the computer resources) will be referred to as a "cluster".

The processing server 130 is a server for executing the application that is managed by the application management server 105, and includes an application management unit 131 that stores an execution code of the application that is deployed by the application management server 105. In the application management unit 131, a plurality of applications may be registered. In a case where the plurality of applications are registered, the cluster is generated for each of the processing requests of the application, and thus, the processing server 130 belongs to a plurality of clusters, and the processing of each of the applications is allocated to one or more processing servers 130 belonging to each of the clusters.

In this example, an example will be described in which the servers are physically different computers, respectively. However, it is not necessary that the servers are different computers, and a function unit of some servers described above may be implemented on a single computer. For example, in the information processing system, one computer (temporarily referred to as a "management server") may be provided instead of the request generation server 103, the data management server 104, the application management server 105, and the resource management server 120, described above, and function units of the request generation server 103, the data management server 104, the application management server 105, and the resource management server 120, described above, may be provided on the management server. Alternatively, one (or a plurality) of the processing servers may be used as the management server.

Further, as another embodiment, information processing system may be configured by executing software for providing a so-called virtual computer (in general, referred to as a hypervisor) on one or a plurality of computers provided in the information processing system, and by defining a virtual computer serving the function of the request generation server, a virtual computer serving the function of the data management server, a virtual computer serving the function of the application management server, and a virtual computer serving the function of the resource management server, on the computer.

Figure 2:
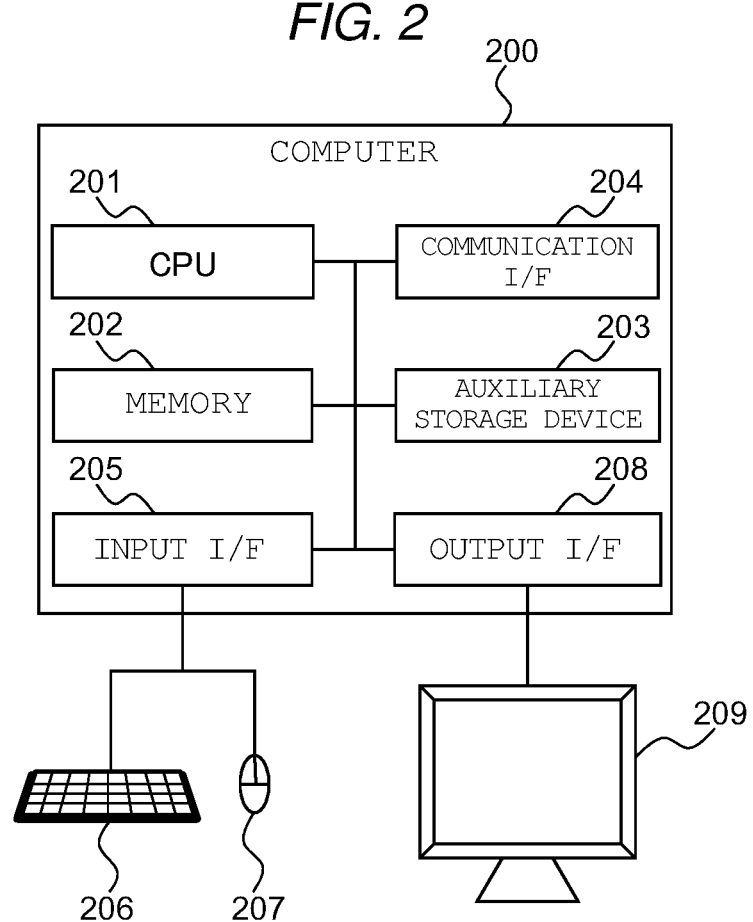
FIG. 2 is a diagram illustrating an example of a physical configuration of various servers.

FIG. 2 is a diagram illustrating a physical configuration of the request generation server 103, the data management server 104, the application management server 105, the resource management server 120, the processing server 130, and the client terminal 101, illustrated in FIG. 1. In this example, in the servers (or the client terminals), a computer 200 including a processor (CPU) 201, a memory 202, an auxiliary storage device 203, and a communication interface (a communication I/F) 204 is used. The computer may be a general-purpose computer such as a personal computer (PC), as an example.

The processor 201 executes a program that is stored in the memory 202. The number of processors 201 is not limited to 1. The computer 200 may include a plurality of processors 201. In addition, the processor 201 may be a so-called multi-core processor including a plurality of processor cores. The memory 202 includes an ROM that is a non-volatile storage element, and a RAM that is a volatile storage element. The ROM stores an invariable program (for example, BIOS) and the like. The RAM is a high-speed volatile storage element such as a dynamic random access memory (DRAM), and temporarily stores a program that is executed by the processor 201 and data that is used at the time of executing the program.

The auxiliary storage device 203, for example, is a large-capacity non-volatile storage device such as a magnetic storage device (HDD) and a flash memory (SSD), and stores a program that is executed by the processor 201 and data that is used at the time of executing the program. That is, the program is read out from the auxiliary storage device 203, is loaded on the memory 202, and is executed by the processor 201.

The communication interface 204 is a network interface device that controls communication with respect to other devices, in accordance with a predetermined protocol.

In addition, the computer 200 may include an input interface (an input I/F) 205 and an output interface (an output I/F) 208. The input interface 205 is an interface that is connected to a keyboard 206, a mouse 207, or the like, and receives input from an operator. The output interface 208 is an interface that is connected to a display device 209, a printer, or the like, and outputs an execution result of the program in a format that is visible for the operator.

Furthermore, in this example, each function unit of the application management server 105, the resource management server 120, and the processing server 130 may be implemented by software (a program). For example, in the resource management server 120, a program for allowing the resource management server 120 to function as the resource allocation information storage unit 121, the application progress information storage unit 122, the cluster generation unit 123, the cluster monitoring unit 124, and the cluster deletion unit 125 is loaded on the memory 202 of the resource management server 120 (the computer 200), and is executed by the processor 201. Accordingly, the resource management server 120 is operated as a device including the resource allocation information storage unit 121, the application progress information storage unit 122, the cluster generation unit 123, the cluster monitoring unit 124, and the cluster deletion unit 125.

Similarly, in the processing server 130, a program for realizing each of the function units described above is executed by the processor 201 of the computer 200 (the resource management server 120 or the processing server 130). Accordingly, the processing server 130 is operated as a device including each of the function units described above. Hereinafter, processing to be executed by the application management server 105, the resource management server 120, the processing server 130, or the like may be described by using the function unit of the resource allocation information storage unit 121, the cluster generation unit 123, or the like, as a subject, but this practically indicates that the processing is performed by the processor 201 of the computer 200 including the function unit.

In addition, the program to be executed by the processor 201 is provided to the computer 200 through a computer readable storage medium or a network, and is stored in the auxiliary storage device 203 that is a non-temporary storage medium. The computer readable storage medium is a non-temporary computer readable medium, and for example, is a non-volatile removable medium such as a CD-ROM or a flash memory. For this reason, the computer 200 may include an interface that reads data from a removable medium.

In addition, as another embodiment, a part or all of the function units may be implemented by using hardware such as FPGA or ASIC.

FIG. 3 is a diagram illustrating an example of a data table 300 that is retained in the resource management server 120 and is managed by the resource allocation information storage unit 121. In this example, an example will be described in which the resource allocation information storage unit 121 stores various information items in the data table 300 that is formed on a storage region of the memory 202 or the auxiliary storage device 203.

The resource allocation information storage unit 121 manages the information of all of the processing servers 130 in which the application can be arranged, and also manages the information of the processing servers 130 in which the same application is arranged, and the cluster is formed, in the processing servers 130, by storing the information in the data table 300.

Each row (each record) of the data table 300 that is managed by the resource allocation information storage unit 121 includes seven columns (sections) illustrated in FIG. 3, and in each of the records, the information with respect to the processing server 130 in the information processing system is stored. A section of a node name 301 is a section for storing the name of the processing server 130. Each of the processing servers 130 has a unique name in the information processing system, and in this example, the name will be referred to as a "node name". In a section of an IP address 302, an IP address of the processing server 130 that is specified by the node name 301 is stored. In a section of a CPU Core 303, the number of processor cores (CPU Cores) of the processing server 130 is stored.

In a section of a Pool flag 304, flag information indicating whether or not the processing server 130 is a node of a computer resource that is ensured in advance as the information processing system is stored. In the case of the node that is ensured in advance (including a node that is ensured in advance from a cloud or the like), "true" is stored, and in the case of a node that is temporarily ensured from the cloud or the like, with respect to the execution request of the application, as necessary, "false" is stored.

In a section of a cluster name 305, in a case where the processing server 130 belongs to a cluster, the name of the cluster to which the processing server 130 belongs is stored, and in a section of a degree of parallelism 306, the number of processor cores allocated to the cluster is stored. For this reason, a difference between the CPU Core 303 and the degree of parallelism 306 is calculated, and thus, the number of processor cores (referred to as an "unused core") not yet allocated to any cluster yet is obtained. In addition, in a section of an application name 307, an application name of the application that is arranged in the processing server 130 is stored. The application name is a name that is used for specifying the application when the application user requests the execution of the application.

Furthermore, in this example, it has been described on the premise that the processing server 130 includes a so-called multi-core processor, but in a case where the processor of the processing server 130 is a single core processor, in the section of the CPU Core 303 or the section of the degree of parallelism 306, the number of processors is stored instead of the number of processor cores.

In addition, in this example, in each of the records of the data table 300 that is managed by the resource allocation information storage unit 121, information included in an assembly of the records with the same cluster name 305, in particular, information of columns 305 to 307 of the records will be referred to as "cluster information". In FIG. 3, the information of each of the columns 305 to 307 of a row 310-5 and a row 310-6 is cluster information with a cluster name of "User5-AppB-1" and cluster information with a cluster name of "User6-AppB-1". It is possible to know the processing server 130 belonging to the cluster, and the number of CPU Cores, with reference to the cluster information.

When the cluster generation unit 123 of the resource management server 120 described below generates (defines) the cluster, the processing server 130 belonging to the cluster is selected from the data table 300. Then, the cluster generation unit 123 stores information such as the cluster name, the number of CPU Cores to be used, and the like, in the columns 305 to 307 of the record corresponding to the selected processing server 130. In this example, processing in which the cluster generation unit 123 stores the information such as the cluster name in the columns 305 to 307 will be referred to as processing of "preparing the cluster information". By preparing the cluster information, the computer resource to be used for executing the application is substantially ensured (reserved).

On the contrary, in a case where the execution of the application in the defined cluster is ended, the cluster deletion unit 125 deletes the information such as the cluster name from the columns 305 to 307. The processing will be referred to as processing of "deleting the cluster information". By deleting the cluster information, the computer resource that is ensured in order to execute the application is substantially released, and the released computer resource can be used in other uses.

Here, in a case where a computer resource on a cloud (not illustrated) is used as the processing server 130, that is, in a case where the computer resource on the cloud is ensured and used for each cluster generation request, a record is added to the data table 300 that is managed by the resource allocation information storage unit 121 every time when the computer resource is ensured, and in a case where the execution of the application is ended, and the cluster is deleted, the record is deleted.

In addition, in a case where the processing server 130 retains a plurality of CPU Cores, and the degree of parallel of the application is less than the number of CPU Cores of the processing server 130, a plurality of applications may be arranged in one processing server 130. In this case, the processing server 130 belongs to a plurality of clusters.

In addition, in this example, in a case where the processing server 130 includes n CPU Cores, basically, the computer resource is ensured on the premise that n execution codes of the application can be executed in parallel. For this reason, in a case where the degree of parallel of the application is 4 (in a case where the application user requests the execution of four applications in parallel), the cluster generation unit 123 (described below) of the resource management server 120 selects one or a plurality of processing servers 130 including unused cores. At this time, the cluster generation unit 123 selects the processing server 130 such that the number of unused cores of the selected processing server 130 is (greater than or equal to) 4.

However, in accordance with the characteristics of the application, one or a plurality of processing servers 130 may be selected in consideration of memory capacity or processing performance of the CPU, in addition to the number of CPU Cores.

Here, in a case where the computer resource is not capable of being ensured only by the number of CPU Cores that can be selected with respect to the degree of parallel of the application, an expected execution time of the application is added, and whether the computer resource is newly ensured from the cloud or the like, or the processing server 130 least affected by a processing time or a user request is selected from the processing servers 130 that are already allocated is determined. The details will be described below in FIG. 6.

FIG. 4 is a diagram illustrating an example of a data table 400 that is retained in the resource management server 120 and is managed by the application progress information storage unit 122.

The application progress information storage unit 122 is a function unit storing a cluster usage situation or request information from the user, and information relevant to an execution time of the application, for each cluster executing one application, and uses the storage region of the memory 202 or the auxiliary storage device 203 in order to store such information items. The application progress information storage unit 122 may be implemented by using a program such as a known file system program or a known database management system (DBMS), as an example.

The data table 400 that is managed by the application progress information storage unit 122 includes eight columns (sections), as illustrated in FIG. 4. Hereinafter, information stored in each of the columns will be described. In a section of a cluster name 401, a cluster name uniquely indicating the cluster that is an assembly of the computer resources generated for each application execution request from the user is stored. The same name as the cluster name 305 of the data table 300 that is managed by the resource allocation information storage unit 121 is stored.

In a section of a degree of parallelism 402, the total number of CPU Cores used in the cluster is stored, and is the number obtained by adding the degree of parallelism 306 of the data table 300 that is managed by the resource allocation information storage unit 121 in the same cluster.

In a section of a coexistence number 403, in the degree of parallelism 402, the number of CPU Cores coexisting with other clusters is stored.

In a section of a Pool usage number 404, in the degree of parallelism 402, the number of times of using the CPU Core of the processing server 130 in which the Pool flag 304 of the data table 300 that is managed by the resource allocation information storage unit 121 is "true" is stored.

In a section of a level of variation in execution time 405, information indicating a level of variation at the expected execution time that is set by the user at the time of sending the execution request of the application is stored. In this example, the level of variation in execution time is expressed by a numerical value of 0, 1, and 2, and it is indicated that a variation with respect to the expected execution time increases as the number increases (it is indicated that an allowable range in which an actual execution time is longer than the expected execution time increases). For example, it is indicated that in a case where the level of variation in execution time is 0, the variation with respect to the expected execution time is approximately several minutes, in a case where the level of variation in execution time is 1, the variation with respect to the expected execution time is approximately several tens of minutes, and in a case where the level of variation in execution time is 2, the variation with respect to the expected execution time is approximately several hours. That is, the level of variation in execution time indicates an allowance level of the degree of deviation of the expected execution time that is requested by the user.

In a section of a remaining time 406, a remaining time until the application is completed that is calculated from a progress situation of the processing of the application executed in the cluster is stored. In the progress situation of the processing of the application, for example, the total number of processings executed by the application is N, and M processings of N processings progress, and thus, the current progress is M/N, the current progress is multiplied by the expected execution time, and the remaining time is calculated. A calculation method of the progress situation is different for each application, and thus, logic for measuring a progress situation is incorporated at the time of developing the application, and is output as log or the like, and thus, the progress situation can be grasped.

In a section of a first scheduled end time 407, an end expected time that is calculated from the expected execution time of the application at the time of receiving the execution request of the application from the user is stored.

In a section of a coexistence time 408, a time when the application in the cluster coexists with an application in the other cluster and the CPU Core is stored.

In a case where there is the execution request of the application from the user, but the number of CPU Cores that is requested for the execution of the application is not capable of being ensured only by the number of selectable CPU Cores, whether or not to select the processing server 130 least affected by the processing time or the user request from the already allocated processing servers 130 is determined by using the information stored in the data table 400 that is managed by the application progress information storage unit 122. The details will be described below in FIG. 6.

Figure 5:
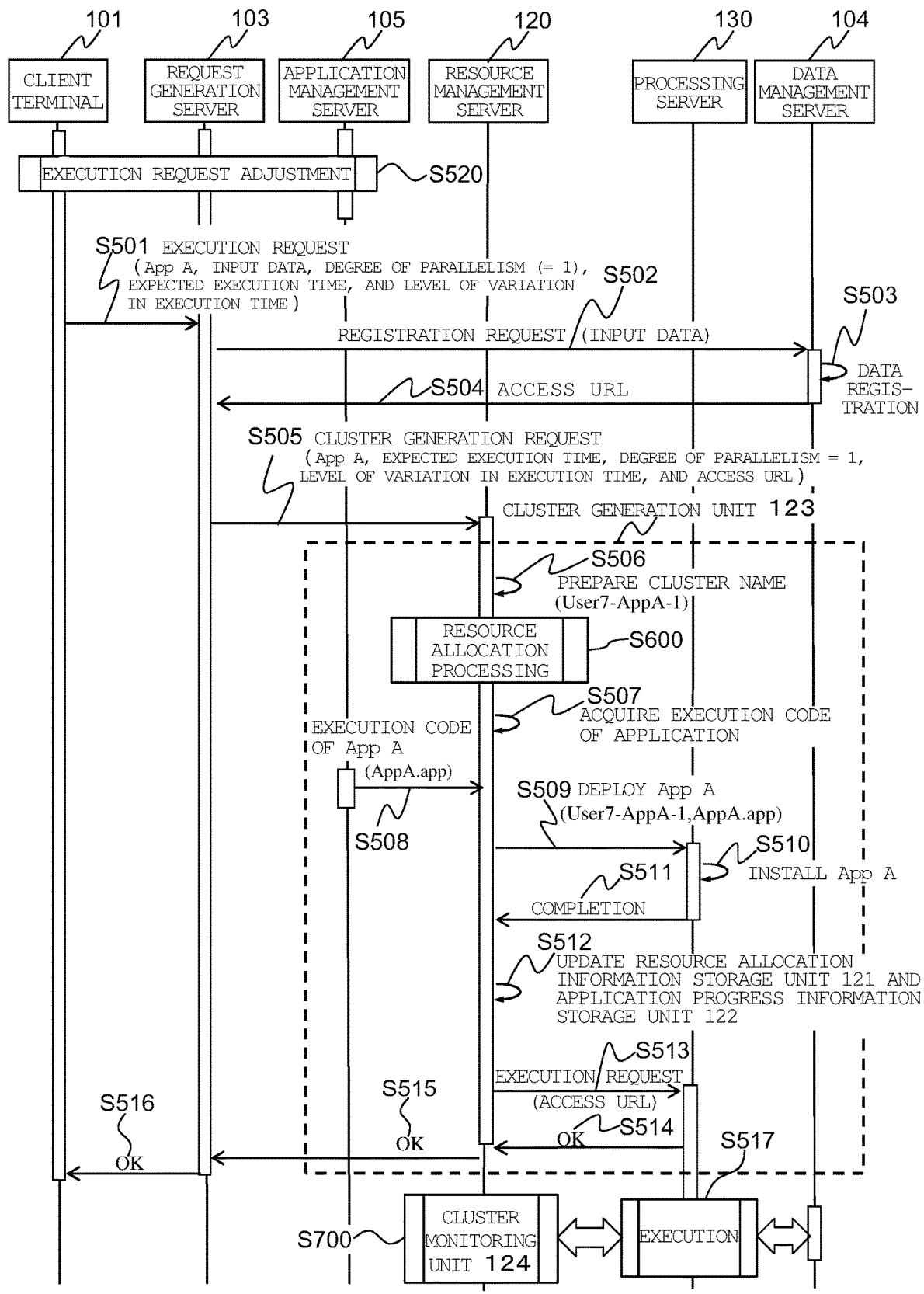
FIG. 5 is a diagram illustrating an example of an operation flow until a resource is allocated and an application is executed from an application execution request.

FIG. 5 is a sequence diagram illustrating a flow of processing that is performed in each of the servers of the information processing system when the application user requests the execution of the application by using the information processing system according to this example. In FIG. 5, the flow of the processing until the client terminal 101 issues the request to the request generation server 103, and the cluster executing the application is generated is described.

First, the application user performs execution request adjustment (S520) by using the request generation server 103 or the application management server 105, while manipulating the client terminal 101. In the execution request adjustment (S520), the application user selects an application to be used, registers the input data, sets the degree of parallel at the time of executing the application, and sets the level of variation in the expected execution time, while considering the expected execution time calculated by the application management server 105 or the cost thereof.

Here, it is assumed that the application management server 105 managing the information of the application is used in the calculation of the expected execution time.

In a case where the application user performs the execution request adjustment (S520), the client terminal 101 receives the application name of the application that is used by the application user, and the input data from the application user, and transmits the execution request of the application to the request generation server 103 (S501). In the execution request of the application, the application name (for example, "AppA" and the like), the input data, the degree of parallel, the expected execution time, and the level of variation in execution time are included. First, the request generation server 103 registers the input data in the data management server 104, in accordance with the execution request (S502 and S503). In a case where the input data is received, the data management server 104 returns an access uniform resource locator (URL) that is an access method with respect to the input data to the request generation server 103 (S504). At this time, the request generation server 103 retains the URL with respect to the input data and the application name in association with each other.

Next, the request generation server 103 transmits the cluster generation request in which the application name, the expected execution time, the degree of parallel, the level of variation in execution time, and the access URL are designated to the resource management server 120 (S505).

In a case where the cluster generation request (S505) is received, the resource management server 120 executes the processing of the cluster generation unit 123. In the cluster generation unit 123, first, the cluster name that can be uniquely identified is prepared (S506), resource allocation processing (S600) for ensuring the computer resource (the CPU Core) of the processing server 130 in accordance with the degree of parallel or the level of variation in execution time is executed. The details of the resource allocation processing (S600) will be described below in FIG. 6.

In order to suitably allocate the processing server 130 by the resource allocation processing (S600), and to arrange the application with respect to the allocated processing server 130, first, the execution code of the application is acquired from the application management server 105 (S507 and S508), and the arrangement of the application is requested to each of the processing servers 130 (S509).

The processing server 130 to which the arrangement of the application is requested installs the application (S510), and in a case where the arrangement of the application with respect to each of the processing servers 130 belonging to the cluster is completed (S511), the resource management server 120 updates data table information that is managed by the resource allocation information storage unit 121 and the application progress information storage unit 122 (S512), and transmits the execution request to one or a plurality of processing servers 130 belonging to the cluster, along with the access URL (S513).

In a case where the execution request is received, the processing server 130 returns OK to the resource management server 120 (S514), and executes the application (S517).

In a case where OK is received from the processing server 130, the resource management server 120 returns OK to the client terminal 101 through the request generation server 103 (S515 and S516), completes the processing of the cluster generation unit 123 and activates the cluster monitoring unit 124, and monitors an execution situation of the application of the processing server 130. The details of the processing of the cluster monitoring unit 124 will be described below in FIG. 7.

Figure 6:
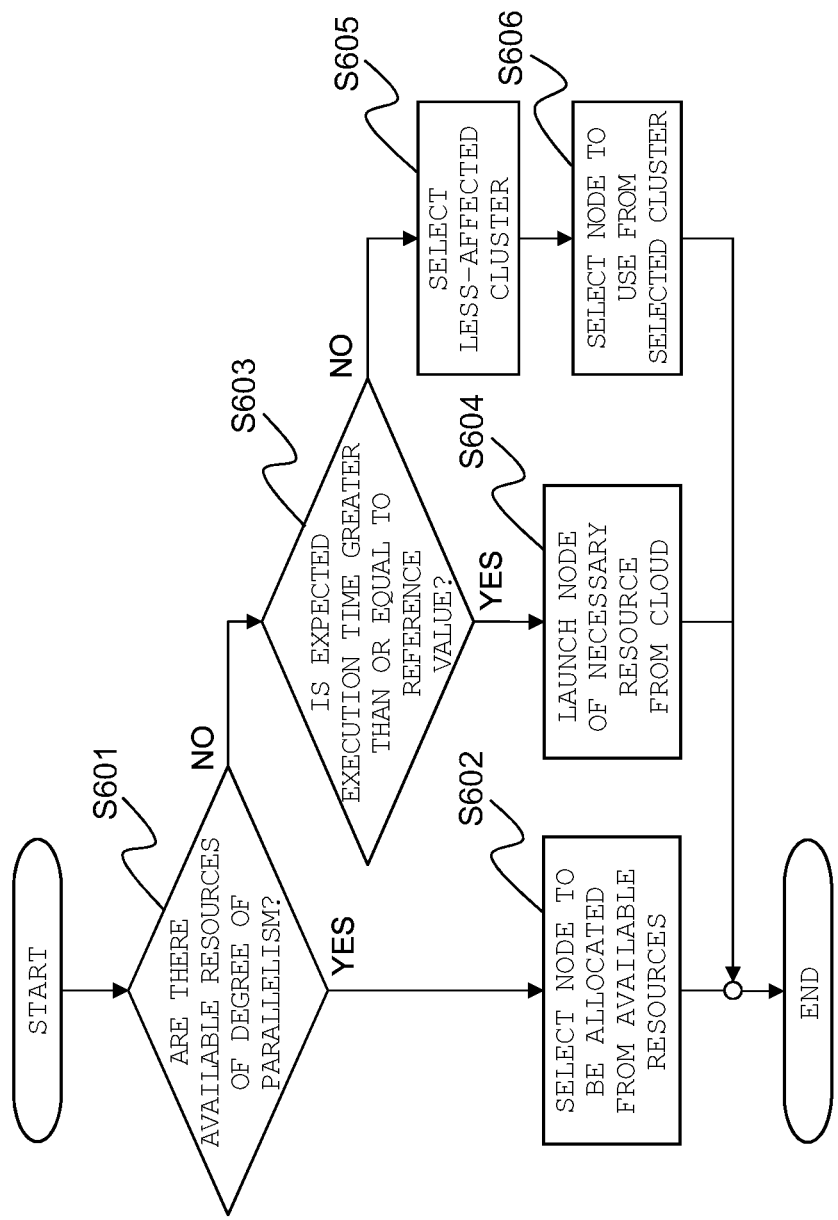
FIG. 6 is a diagram illustrating an example of an operation flow of resource allocation processing.

FIG. 6 is an example of an operation flow of the resource allocation processing (S600) that is a part of the processing of the cluster generation unit 123 of the resource management server 120.

In Step S601, first, it is determined whether or not there are available computer resources of the degree of parallelism that is a parameter of the cluster generation request (S505) received from the request generation server 103, by calculating the number of unused cores from the data table 300 that is managed by the resource allocation information storage unit 121. In a case where it is determined that there are available computer resources, the process proceeds to S602, and in a case where it is determined that there are not enough available computer resources, the process proceeds to S603.

In Step S602, the processing server 130 to be allocated is selected from the processing servers 130 including the available computer resources, and the resource allocation processing is ended.

In Step S603, it is determined whether or not the expected execution time of the application that is the parameter of the cluster generation request (S505) is greater than or equal to a reference value.

Here, the reference value that is compared with the expected execution time, for example, is set in advance as a threshold value of whether or not the application user who waits for a time when insufficient computer resources are ensured and launched from the cloud has an impression that the quality of service is reduced by an increase in the expected execution time due to a standby time, in a case where there is the execution request of the application of which the expected execution time is a short. For example, on the contrary, in a case where there is the execution request of the application of which the expected execution time is long, even in a case where the application user waits for the time when insufficient computer resources are ensured and launched from the cloud, a ratio of an increase in the expected execution time is relatively small, and thus, the application user does not feel that the quality of service is reduced.

That is, as the reference value, for the purpose of allowing the standby time necessary for launching the computer resource to be not relatively longer than the expected execution time, and of allowing the application user not to feel that the quality of service is reduced, for example, a reference value is set such that the expected execution time of the application is longer than or equal to 1 minute, or is approximately the same (or approximately half thereof) as the time necessary until the computer resource is ensured and launched from the cloud (the log of a performance value is acquired, and an average value thereof is obtained).

In S603, in a case where the expected execution time is greater than or equal to the reference value, the process proceeds to S604, and in a case where the expected execution time is less than the reference value, the process proceeds to S605.

In Step S604, the insufficient processing servers 130 are launched from the cloud, as the computer resource, the processing servers 130 are allocated, and the resource allocation processing is ended.

In Step S605, the expected execution time is less than the reference value, and thus, a cluster that is less affected by the coexistence of the execution of the application is selected from the execution situation of the application in each of the clusters stored in the data table 400 that is managed by the application progress information storage unit 122, without ensuring the insufficient computer resources from the cloud.

Here, being less affected by the coexistence of the execution of the application indicates that the application in the cluster is executed by coexisting with a new application, and thus, the initial expected execution time of the application in the cluster is lengthened. The influence decreases as a variation in the expected execution time is relatively small with respect to the initial expected execution time.

The cluster less affected by the coexistence of the execution of the application, for example, corresponds to a cluster in which the remaining time 406 is long, the coexistence number 403 is small, the coexistence time 408 is short, and the Pool usage number 404 is large. Priority is set by multiplying such information by a weight coefficient, and thus, the cluster is selected.

In Step S606, the processing server 130 to be allocated from the selected cluster is selected from the data table 300 that is managed by the resource allocation information storage unit 121, and the resource allocation processing is ended.

Figure 7:
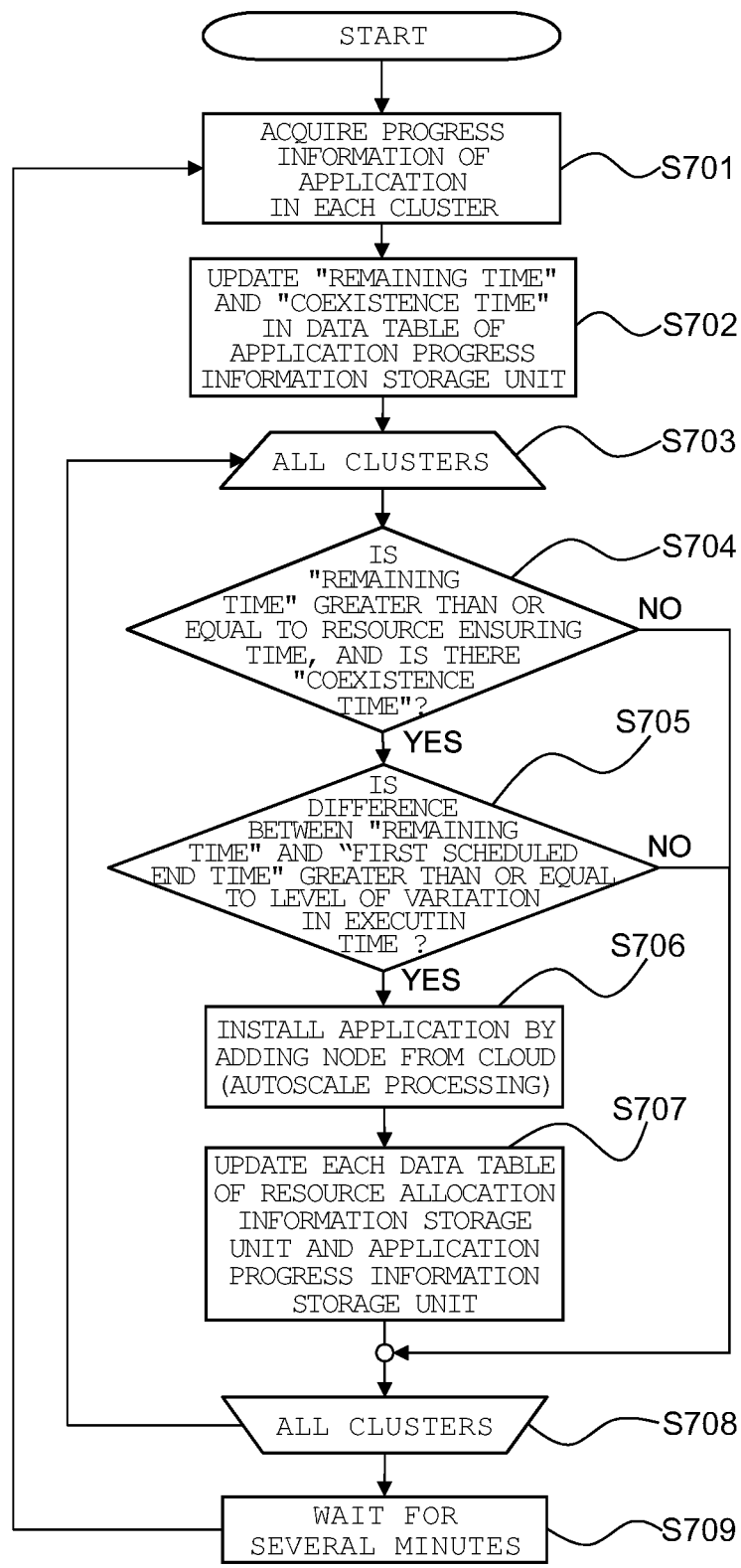
FIG. 7 is a diagram illustrating an example of an operation flow of cluster monitoring processing.

FIG. 7 is an example of an operation flow of the cluster monitoring unit 124 of the resource management server 120.

In Step S701, progress information of the current application is acquired from the applications executed in each of the clusters registered in the data table 400 that is managed by the application progress information storage unit 122.

In Step S702, the remaining time 406 and the coexistence time 408 for each of the clusters registered in the data table 400 that is managed by the application progress information storage unit 122 are updated on the basis of the progress information that is acquired in S701.

Processing between Step S703 and Step S708 is executed with respect to each of the clusters registered in the data table 400 that is managed by the application progress information storage unit 122 one by one.

In Step S704, it is checked whether or not the remaining time 406 is greater than the time necessary for ensuring the computer resource from the cloud, and a value is written in the coexistence time 408. In the case of YES, the process proceeds to S705, in the case of NO, the process proceeds to S708.

In Step S705, it is checked whether or not a difference between an end time of the application that is assumed by the remaining time 406 and the first scheduled end time 407 is greater than the allowable range requested by the user that is indicated by the value set in the level of variation in execution time 405. In the case of YES, the process proceeds to S706, and in the case of NO, the process proceeds to S708.

In Step S706, the processing server 130 is added by newly acquiring the computer resource from the cloud, and the application executed by the cluster is installed in the added processing server 130, and thus, can be executed as the application in the cluster. Such processing is referred to as autoscale processing.

In Step S707, in a case where the autoscale processing is executed in S706, the record of the processing server 130 added to the data table 300 that is managed by the resource allocation information storage unit 121 is stored, and the information of the cluster of the data table 400 that is managed by the application progress information storage unit 122 is updated.

In Step S709, processing is periodically executed from Step S701 by waiting for several minutes.

According to the processing of the cluster monitoring unit 124 described above, even in a case where it is expected that the execution of the application coexists, a difference between the first scheduled end time and the end time assumed from the remaining time increases, and a difference in the execution time of greater than or equal to the level of variation in execution time designated by the application user (an allowable time range) occurs, it is possible to automatically shorten the execution time, and to suppress the execution time to be within the range of the level of variation in execution time, by performing the autoscale processing of ensuring the computer resource from the cloud.

In addition, in this example, the priority increases as the application coexists in ascending order of the remaining time, by the cluster generation unit 123, and thus, it is possible to effectively use the shortening of the execution time according to the autoscale processing of the cluster monitoring unit 124.

Figure 8:
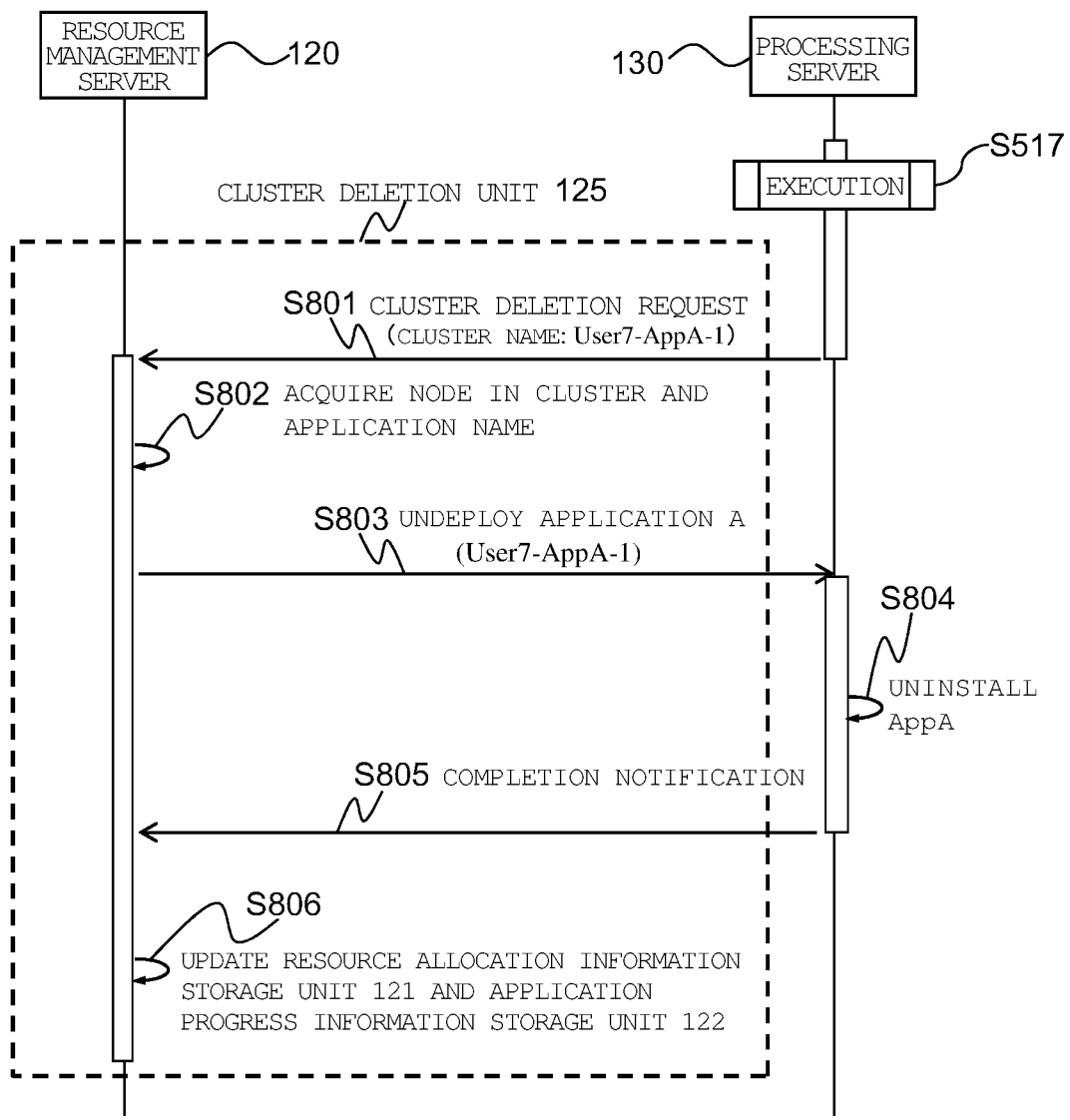
FIG. 8 is a diagram illustrating an example of an operation sequence until a cluster is deleted after application execution is completed.

FIG. 8 is a sequence diagram illustrating a flow of processing that is performed in each of the servers of the information processing system when the execution of the application of the processing server 130 is ended. In FIG. 8, the flow of the processing until the cluster is deleted after the execution of the application of the processing server 130 is ended is described.

First, in a case where a cluster deletion request (S801) of which the cluster name is designated is received from the processing server 130, the resource management server 120 executes the cluster deletion unit 125. The cluster deletion unit 125 specifies the processing server 130 in the cluster and the application name with reference to the data table 300 that is managed by the resource allocation information storage unit 121 (S802). Next, an application deletion request (S803) is transmitted to each of the specified processing servers 130.

Each of the processing servers 130 receiving the application deletion request uninstalls the application (S804), and returns a completion notification (S805) to the resource management server 120. In a case where the completion notification (S805) is received, the information relevant to the cluster is deleted from the data table 300 that is managed by the resource allocation information storage unit 121 and the data table 400 that is managed by the application progress information storage unit 122. Here, in the information relevant to the cluster in the data table 300 that is managed by the resource allocation information storage unit 121, in the case of the processing server 130 of which the Pool flag is "true", only the cluster information is deleted, and in the case of the processing server 130 of which the Pool flag is "false", each of the records is deleted.

Figure 9:
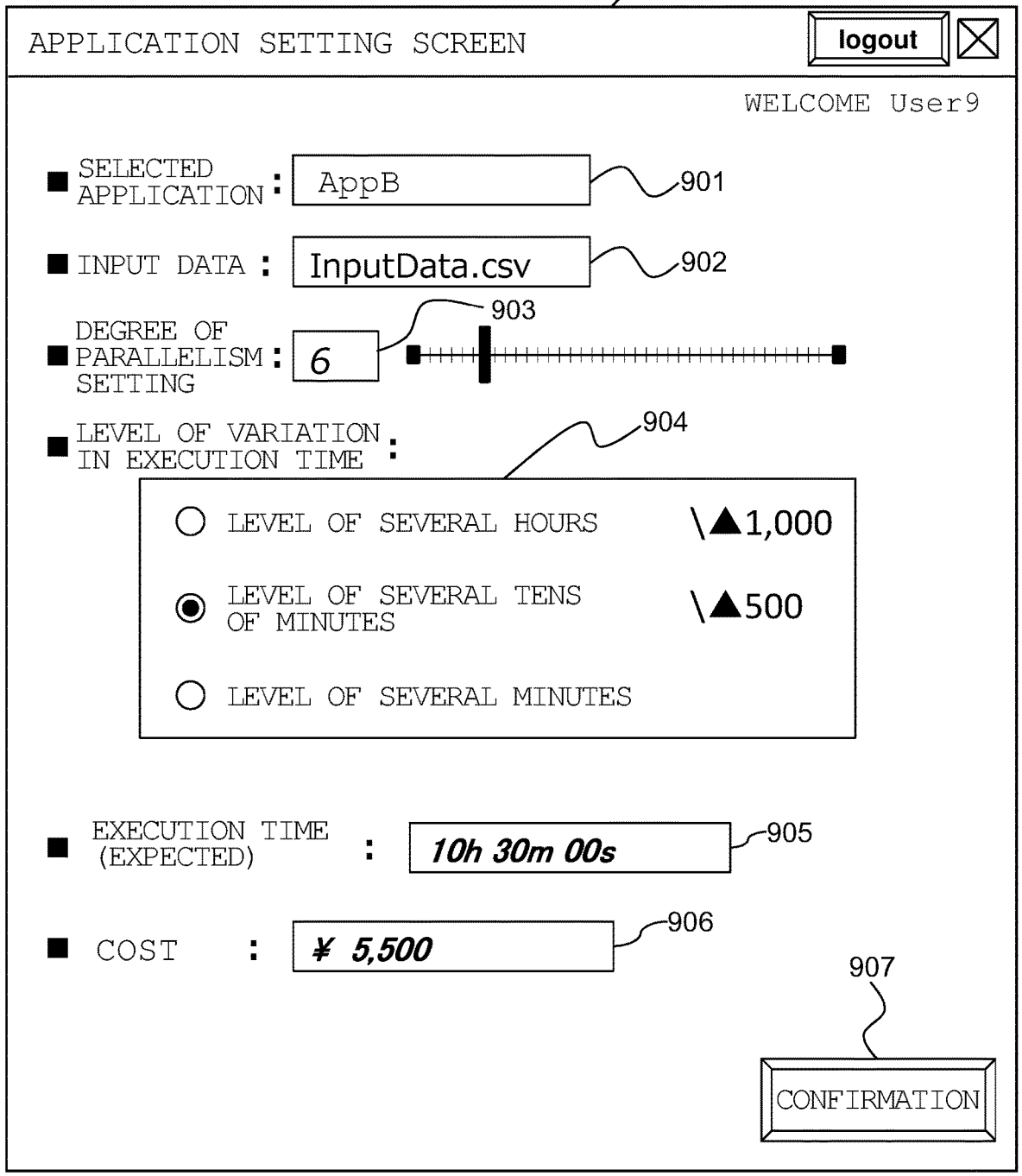
FIG. 9 is a diagram illustrating an example of a setting screen for an application user to determine an application, input data, a degree of parallel, or a level of variation in execution time, for each execution request.

FIG. 9 is an example of a setting screen image for the application user to determine the application, the input data, the degree of parallel, and the level of variation in execution time, for each of the execution requests. In this example, an example will be described in which the request generation server 103 prepares a setting screen 900, and provides the setting screen 900 to the client terminal 101 (displays the setting screen 900 on the display device 209 of the client terminal 101). However, a computer other than the request generation server 103 may prepare the setting screen 900.

In FIG. 9, "901" is an application name input box, "902" is a data name input box, "903" is a degree of parallelism setting section, and "904" is a level of variation in execution time setting section (the application user designates which guarantee level is requested for an allowable range of the variation in the actual execution time with respect to the expected execution time. For example, in a case where the range of variation in the execution time is allowed to a level of several tens of minutes, it is indicated that 500 yen is reduced). The application user inputs each of the application name input box 901, the data name input box 902, the degree of parallelism setting section 903, and the level of variation in execution time setting section 904, and thus, performs a query with respect to the application management server 105 through the request generation server 103, calculates the expected execution time that is assumed by the application management server 105, calculates the cost on the basis of the setting of the expected execution time, the degree of parallel, and the level of variation in execution time, prepares a screen on which the result is displayed in display regions 905 and 906, and displays the screen on the client terminal 101.

For this reason, the application user may repeatedly increase the degree of parallel to be input into the degree of parallelism setting section 903 bit by bit until the expected execution time of the application to be displayed in the display region 905 is within a desired execution time of the application user.

In addition, in a case where the information processing system is operated such that the application user pays a using fee to a manager (or a possessor) of the information processing system, in accordance with the amount of computer resources to be used and a using time of the computer resource, a cost display section 906 may be provided in the setting screen 900, the request generation server 103 (or the application management server 105) may calculate a cost according to the degree of parallel of the application, the execution time of the application (the execution time in a case where the applications are executed in parallel), and the value of the level of variation in execution time (the using fee of the information processing system), and may provide the information of the calculated cost to the application user. Accordingly, the application user is capable of determining the degree of parallel satisfying the current execution request (the degree of parallel at the time of the execution) while confirming a balance between the execution time for completing the application and the cost depending on the degree of parallel.

In a case where a confirmation button 907 is pressed after the application user determines the setting at the time of the execution, the processing of S501 in FIG. 5 is performed.

The information processing system according to this example has the functions described above, and thus, even in a case where the computer resource pool is depleted, it is possible to quickly start the application program, and even in the case of the application that is ended in a short amount of time, it is possible to complete the processing without reducing the quality of service.

REFERENCE SIGNS LIST

101 Client terminal
102 Network
103 Request generation server
104 Data management server
105 Application management server
120 Resource management server
121 Resource allocation information storage unit
122 Application progress information storage unit
123 Cluster generation unit
124 Cluster monitoring unit
125 Cluster deletion unit
130 Processing server
200 Computer
201 Processor (CPU)
202 Memory
203 Auxiliary storage device
204 Communication interface (communication I/F)
205 Input interface (input I/F)
206 Keyboard
207 Mouse
208 Output interface (output I/F)
209 Display device
300 Data table managed by resource allocation information storage unit
400 Data table managed by application progress information storage unit
900 Setting screen for application user to determine application, input data, degree of parallel, or level of variation in execution time, for each execution request
901 Application name input box
902 Data name input box
903 Degree of parallelism setting section
904 Level of variation in execution time setting section
905 Expected execution time display region
906 Cost display section
907 Confirmation button

The invention claimed is:

1. An information processing system comprising:
a management server; and
a plurality of processing servers,
the information processing system providing execution of an application program through a network in accordance with a request from a user,
wherein each of the processing servers includes one or more processors for executing the application program,
the management server manages computer resources that are capable of being executed as each of the processing servers, a usage state of the computer resource, and a cluster usage situation or request information from the user, and information relevant to an execution time of the application program, for each cluster executing one application program, and
in a case where no computer resources managed by the management server is available, and an expected execution time of the application program that is a target of an execution request is less than or equal to a reference value, at the time of receiving a degree of parallel and the expected execution time of the execution from the user, along with an execution request of the application program,
a cluster generation unit of the management server selects a computer resource executing an application program having a small degree of deviation from an initial expected execution time from the computer resources in use that are managed by the management server, even in a case where a plurality of application programs are temporarily simultaneously executed, and
arranges and executes the application program that is the target of the execution request with respect to the selected computer resource.

2. The information processing system according to claim 1,
wherein even in a case where the plurality of application programs are temporarily simultaneously executed, the cluster generation unit of the management server preferentially selects a computer resource belonging to a cluster in which a remaining time is long, a coexistence number is small, a coexistence time is short, and a Pool usage number is large, at the time of selecting the computer resource executing the application program having a small degree of deviation from the initial expected execution time.

3. The information processing system according to claim 2,
wherein even in a case where the plurality of application programs are temporarily simultaneously executed, the cluster generation unit of the management server preferentially selects a computer resource belonging to a cluster in which priority is set by multiplying small and large values of each information item of the remaining time, the coexistence number, the coexistence time, and the Pool usage number, by a weight coefficient, at the time of selecting the computer resource executing the application program having a small degree of deviation from the initial expected execution time.

4. The information processing system according to claim 1,
wherein the management server manages a level of variation in execution time indicating an allowance level of the degree of deviation of the expected execution time that is requested along with the execution request of the application program by the user, in addition to the usage state of the computer resource, and the information relevant to the execution time of the application program in each of the clusters,
a cluster monitoring unit of the management server acquires progress information of the application program in each of the clusters for each cycle time of a predetermined time, and updates the remaining time and the coexistence time, and
the cluster monitoring unit of the management server newly acquires a computer resource with respect to a cluster in all of the clusters that are managed in which the remaining time is longer than or equal to a time necessary for ensuring the computer resource from a cloud, there is the coexistence time, and a difference between an end time of the application program that is assumed by the remaining time and a first scheduled end time is greater than or equal to an allowable range requested by the user that is indicated by the level of variation in execution time, from the cloud, and installs the application program that is executed by the cluster.

5. The information processing system according to claim 1,
wherein the management server presents a screen for setting execution request information to a client terminal when the user considers the execution request of the application program,
a section for selecting a level of variation in execution time indicating an allowance level of the degree of deviation of the expected execution time is arranged on the screen, along with each section for setting a selected application name, input data, and the degree of parallel, and
the management server receives the setting of the selected application name, the input data, and the degree of parallel of the user, simulates execution of the selected application program on the basis of the input data and the degree of parallel, calculates the expected execution time, presents the expected execution time on the screen, and then, receives the calculated expected execution time, the degree of parallel that is set by the user, and the level of variation in execution time, calculates a cost, and presents the cost on the screen.

6. The information processing system according to claim 1,
wherein a part or all of the plurality of processing servers are a computer resource that is acquired in advance from a cloud.

7. A resource allocation method of an information processing system that includes a management server, and a plurality of processing servers, and provides execution of an application program through a network in accordance with a request from a user,
wherein each of the processing servers includes one or more processors for executing the application program,
the management server manages computer resources that are capable of being executed as each of the processing servers, a usage state of the computer resource, and a cluster usage situation or request information from the user, and information relevant to an execution time of the application program, for each cluster executing one application program,
in a case where no computer resources managed by the management server is available, and an expected execution time of the application program that is a target of an execution request is less than or equal to a reference value, at the time of receiving a degree of parallel and the expected execution time of the execution from the user, along with an execution request of the application program,
the management server selects a computer resource executing an application program having a small degree of deviation from an initial expected execution time from the computer resources in use that are managed by the management server, even in a case where a plurality of application programs are temporarily simultaneously executed, and
arranges and executes the application program that is the target of the execution request with respect to the selected computer resource.

8. The resource allocation method according to claim 7,
wherein even in a case where the plurality of application programs are temporarily simultaneously executed, the management server preferentially selects a computer resource belonging to a cluster in which a remaining time is long, a coexistence number is small, a coexistence time is short, and a Pool usage number is large, at the time of selecting the computer resource executing the application program having a small degree of deviation from the initial expected execution time.

9. The resource allocation method according to claim 8,
wherein even in a case where the plurality of application programs are temporarily simultaneously executed, the management server preferentially selects a computer resource belonging to a cluster in which priority is set by multiplying small and large values of each information item of the remaining time, the coexistence number, the coexistence time, and the Pool usage number, by a weight coefficient, at the time of selecting the computer resource executing the application program having a small degree of deviation from the initial expected execution time.

* * * * *